United States Patent
Chao et al.

(10) Patent No.: US 9,317,157 B2
(45) Date of Patent: Apr. 19, 2016

(54) CLUSTERED SCAN METHOD OF A CAPACITIVE TOUCH DEVICE

(71) Applicant: ELAN MICROELECTRONICS CORPORATION, Hsin Chu (TW)

(72) Inventors: Tsz-Hsuan Chao, Guishan Township, Taoyuan County (TW); Yi-Shiang Lu, Tainan (TW); Chia-Hsing Lin, Hsinchu (TW); Po-Hao Kuo, Bade (TW); Yi-Shu Li, Zhubei (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 75 days.

(21) Appl. No.: 14/284,815

(22) Filed: May 22, 2014

(65) Prior Publication Data

US 2015/0234521 A1 Aug. 20, 2015

(30) Foreign Application Priority Data

Feb. 17, 2014 (TW) ............... 103105052 A

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01)

(58) Field of Classification Search
CPC .................. G06F 3/044; G06F 3/0416
See application file for complete search history.

(56) References Cited

U.S. PATENT DOCUMENTS

| 7,812,827 B2 | 10/2010 | Hotelling et al. |
| 2013/0057480 A1* | 3/2013 | Brunet ............... G06F 3/044 345/173 |
| 2013/0057490 A1 | 3/2013 | Lee et al. |
| 2013/0271410 A1 | 10/2013 | Krah et al. |
| 2013/0335252 A1* | 12/2013 | Roberson ............ G06F 3/044 341/173 |

FOREIGN PATENT DOCUMENTS

TW 201324278 A1 6/2013

* cited by examiner

*Primary Examiner* — Shaheda Abdin
(74) *Attorney, Agent, or Firm* — Muncy, Geissler, Olds & Lowe, P.C.

(57) ABSTRACT

A clustered scan method of a capacitive touch device has steps of simultaneously providing driving signals in one driving cycle to multiple driving lines including the $(i-j)^{th}$ drive line to the $(i+k)^{th}$ drive line, and simultaneously providing driving signals in a next driving cycle to the drive lines including some of the drive lines driven in the previous driving cycle with a sum of the driving signal in each driving cycle greater than zero. When the stimulated drive lines include a bordering drive line, the driving lines are determined according to a relationship among i, j and k. Accordingly, the signal to noise ratio of the touch device can be increased and the adverse effect for common ground occurring between a measuring system and a human body can be reduced so that the multi-finger positioning issue can be resolved.

16 Claims, 14 Drawing Sheets

| STEP | ROW EXCITATION | | | | | | | | | | | | | | | LCD | RESULT | START (ms) | END (ms) |
|---|---|---|---|---|---|---|---|---|---|---|---|---|---|---|---|---|---|---|---|
| | R0 | R1 | R2 | R3 | R4 | R5 | R6 | R7 | R8 | R9 | R10 | R11 | R12 | R13 | R14 | | | | |
| 0 | no | no | no | no | no | no | no | no | no | no | no | no | no | no | no | n/a | n/a | 0 | 12.0 |
| 1 | no | no | no | no | no | no | no | no | no | no | no | no | no | no | no | spectrum | 200-300 KHz | 12.0 | 12.2 |
| 2 | no | no | no | no | no | no | no | no | no | no | no | no | no | no | no | analyzer | 300-400 KHz | 12.2 | 12.4 |
| 3 | no | no | no | no | no | no | no | no | no | no | no | no | no | no | no | ID low noies fs | fA,fB,fC | 12.4 | 12.6 |
| 4 | +A | +B | +C | no | +B | +B | -C | no | +A | -B | -C | no | +A | -B | +C | scan | xa1*,xb1*,xc1* | 12.6 | 12.8 |
| 5 | +A | +B | +C | no | -A | -B | -C | no | -A | -B | +C | no | -A | +B | -C | scan | xa2*,xb2*,xc2* | 12.8 | 13.0 |
| 6 | +A | +B | +C | no | -A | -B | +C | no | -A | +B | +C | no | +A | -B | +C | scan | xa3*,xb3*,xc3* | 13.0 | 13.2 |
| 7 | +A | +B | +C | no | -A | +B | +C | no | +A | +B | -C | no | +A | +B | -C | scan | xa4*,xb4*,xc4* | 13.2 | 13.4 |
| 8 | no | +A | +B | +C | no | +B | -C | no | -A | -B | -C | no | +A | -B | -B | scan | xa5*,xb5*,xc5* | 13.4 | 13.6 |
| 9 | no | +A | +B | +C | no | -A | -B | -C | no | -A | -B | +C | no | +A | +B | scan | xa6*,xb6*,xc6* | 13.6 | 13.8 |
| 10 | no | no | +A | +B | +C | no | -B | +C | no | -B | +B | +C | no | -A | -B | scan | xa7*,xb7*,xc7* | 13.8 | 14.0 |
| 11 | no | +A | +B | +C | no | -A | +B | +C | no | +B | -C | no | -A | +B | +A | scan | xa8*,xb8*,xc8* | 14.0 | 14.2 |
| 12 | +C | no | +A | +B | +C | +C | +B | -B | -C | +B | -C | -A | no | -A | +A | scan | xa9*,xb9*,xc9* | 14.2 | 14.4 |
| 13 | -C | no | +A | +B | +C | no | no | -B | -C | -B | +C | no | no | -A | -A | scan | xa10*,xb10*,xc10* | 14.4 | 14.6 |
| 14 | +C | no | +A | +B | +C | no | no | -B | +B | +B | +C | no | no | +A | +A | scan | xa11*,xb11*,xc11* | 14.6 | 14.8 |
| 15 | -C | no | +A | +B | +C | no | no | +B | +B | -B | -C | no | no | +A | -A | scan | xa12*,xb12*,xc12* | 14.8 | 15.0 |
| 16 | -B | +C | no | +A | +B | +C | no | no | -C | -C | no | -B | -C | no | no | scan | xa13*,xb13*,xc13* | 15.0 | 15.2 |
| 17 | +B | -C | no | +A | +B | +C | no | no | -C | no | -A | -B | +C | no | no | scan | xa14*,xb14*,xc14* | 15.2 | 15.4 |
| 18 | -B | +C | no | +A | +B | +C | no | no | +C | no | -A | +B | +C | no | no | scan | xa15*,xb15*,xc15* | 15.4 | 15.6 |
| 19 | +B | -C | no | +A | +B | +C | no | -A | +C | no | +A | +B | -C | no | no | scan | xa16*,xb16*,xc16* | 15.6 | 15.8 |

FIG.10
PRIOR ART

CLUSTERED SCAN METHOD OF A CAPACITIVE TOUCH DEVICE

BACKGROUND OF THE INVENTION

1. Field of the Invention

The present invention relates to a scan method of a capacitive touch device, and more particularly to a clustered scan method of a capacitive touch device.

2. Description of the Related Art

Current capacitive touch devices usually have two types of scan methods, namely, self-capacitance scanning method and mutual-capacitance scanning method. Various types of mutual-capacitance scanning methods have been developed and dedicated for different demands of capacitive touch devices. Clustered scan method pertains to one type of mutual-capacitance scanning methods. Exemplified below are several examples of the clustered scan method.

As disclosed in U.S. Pat. No. 7,812,827, a simultaneous sensing arrangement technique is applied to a capacitive touch device with multiple sensing points intersected by multiple drive lines and multiple sense lines. Such technique can enhance operation of multi-touch sensing configuration by simultaneously driving multiple rows of drive lines of the capacitive touch device. With reference to FIG. 9A, given 16 drive lines X0~X15 as an example, the drive lines can be classified into four groups, that is, groups 1~4. Each group includes four drive lines. With reference to FIG. 9B, a clustered scan method disclosed by the US patent simultaneously outputs two driving signals 801, 802 to the drive lines in the groups 1 and 2, and sensed values corresponding to the stimulated drive lines are represented by signals X0, X1. As the two driving signals have four in-phase pulses heading in a time duration T1 and four pulses mutually phase-shifted by a 180 degrees trailing in a time duration T2, the sensed values in the time durations T1 and T2 can be considered as (X0+X1) and (X0−X1).

Likewise, the sensed values corresponding to the drive lines in groups 3 and 4 in time durations T3 and T4 are (X2+X3) and (X2−X3) respectively after two driving signals 806, 807 are applied to the drive lines. By sending driving signals to all the drive lines of each non-overlapped group and varying phases of driving signals, inputs done by finger touch can be preliminarily determined by a combined result of the sensed values X0~X3.

Disclosed by US Patent Publication No. 2013/0271410 and applied to an integrated type of liquid crystal display (LCD) touch display of a capacitive touch device, another clustered scan method primarily perform scanning using driving signals with different frequencies first, and then determines a noise value under each driving signal. The lower the noise value is the lower noise of a corresponding driving signal is. Those driving signals with relatively low noise are used to perform scanning.

With reference to FIG. 10, in steps 4 to 19, a vertical blank interval (VBI) of an LCD display device is used for scanning 15 drive lines. Three driving signals with different frequencies A to C are applied to the 15 drive lines in steps 4 to 7. The driving signal with the frequency A is simultaneously applied to the drive lines indicated by R0, R4, R8 and R12. The driving signal with the frequency B is simultaneously applied to the drive lines indicated by R1, R5, R9 and R13. The driving signal with the frequency C is simultaneously applied to the drive lines indicated by R3, R7, R11 and R14. All the rest of the drive lines are not driven.

In steps 8 to 11, the foregoing three driving signals are simultaneously applied to the drive lines next to the drive lines driven in steps 4 to 7 again. In other words, the driving signal with frequency A is simultaneously applied to the drive lines indicated by R1, R5, R9 and R13, the driving signal with frequency B is simultaneously applied to the drive lines indicated by R2, R6, R10 and R14, the driving signal with frequency C is simultaneously applied to the drive lines indicated by R4, R8 and R12, and the rest of the drive lines are not driven. The three driving signals are repeatedly applied in a similar fashion until the scanning process from steps 4 to 11 can be carried out four times. During each scanning process, the phases of the frequencies A, B, C of the driving signals can be further changed and marked by -A, -B and -C. Hence, the use of driving signals with different frequencies and phases can increase the scanning speed and provide better signal-to-noise ratio (SNR).

To cope with the issue of unsatisfactory SNR, US Patent Publication No. 2013/0057490 discloses a technique pertinent to "signal-to-noise ration in touch" to increase SNR and measurement accuracy of a signal generated by touch event or an approaching touch object. With reference to FIG. 11, the technique involves simultaneous application of driving signals 410A, 410B to two drive lines X0, X1. Given four drive lines X0~X3 as an example, consecutive twos of the drive lines (X0, X1), (X1, X2), (X2, X3) are sequentially driven. Suppose that the voltage level of the driving signals 410A~410G is identical to that of the driving signal driving only one drive line. When two drive lines are driven at the same time, a sensing value of a corresponding sense line is doubled. Hence, the SNR increases. However, despite the disclosure of simultaneously driving two, three or four drive lines for the purpose of higher SNR, this technique fails to point out how bordering sense lines should be driven when multiple drive lines are simultaneously driven. For example, if there are n sense lines, when two drive lines are simultaneously driven, the sensing values of non-bordering sense lines, such as the second sense line to the $(n-2)^{th}$ sense line, may be as twice as the sensing value of the bordering sense line, such as the first sense line or the last sense line. False touch determination may arise from uneven distribution of the sensing values of all the sense lines.

From the foregoing examples of the clustered scan method, the clustered scan method is rather common to touch devices. Different clustered scan methods are addressed for corresponding touch devices and technical issues thereof to be resolved.

The multi-point positioning means of conventional capacitive touch sensing circuits takes an approach of driving the drive lines in X axis and measuring the sense lines in Y axis, or driving the drive lines in Y axis and measuring the sense lines in X axis. Sensors are formed by mutual capacitor that are generated between points intersected by X axis and Y axis. When a driving signal with a positive-voltage waveform or a negative-voltage waveform is used to drive a drive line, besides a mutual capacitor generated between the drive line and each intersected sense line, a self capacitor is generated between the drive line and a touch object like a finger when the finger approaches the drive line. However, if the finger and the touch device are not well-grounded, the sensors are susceptible to such self capacitor and the capacitance values measured from the mutual capacitors fails to reflect their true values due to their interaction with such self capacitor. Such inaccuracy upon measuring capacitance values is worsened when the measuring system and the human body are not well-grounded.

SUMMARY OF THE INVENTION

An objective of the present invention is to provide a clustered scan method of a capacitive touch device capable of increasing the SNR of the touch device.

To achieve the foregoing objective, the capacitive touch device has n drive lines and m sense lines and the method comprises steps of:

simultaneously driving a plurality of the n drive lines in a driving cycle, wherein the plurality of drive lines include the $(i-j)^{th}$ drive line to the $(i+k)^{th}$ drive line, and obtaining a sum of a plurality of sensing values corresponding respectively to the plurality of stimulated drive lines through one of the sense lines; and incrementing i by one and resuming the step of simultaneously driving a plurality of the n drive lines until i is equal to n.

Wherein i is a positive integer between 1 and n, j and k are zero or positive integer, each of the plurality of the drive lines is driven by a driving signal, and a sum of all driving signals in the driving cycle is greater than zero, and a relationship among i, j and k is used to determine if the plurality of the drive lines includes a bordering drive line.

To achieve the foregoing objective, the capacitive touch device has n drive lines and m sense lines and the method has a single-line driving mode and a double-line driving mode.

The single-line driving mode uses a first driving signal driving bordering one of the n drive lines and obtains a first sensing value between a stimulated bordering drive line and one of the m sense lines.

The double-line driving mode has steps of:

simultaneously driving the $i^{th}$ drive line and the $(i+k)^{th}$ drive line in a driving cycle and obtaining a second sensing value between the two stimulated drive lines and one of the m sense lines; and incrementing i by one and resuming the step of simultaneously driving the $i^{th}$ drive line and the $(i+k)^{th}$ drive line until i is equal to n.

Wherein i is a positive integer between 1 and n, k is equal to 1, each of the $i^{th}$ drive line and the $(i+k)^{th}$ drive line is driven by a second driving signal under the double-line driving mode, the two second driving signals in the driving cycle include a positive driving signal and a negative driving signal. Thus, a floating status between the capacitive touch device and an object (such as a finger) can be determined by the first sensing value and the second sensing value.

The clustered scan method in accordance with the present invention simultaneously provides driving signals in one driving cycle to multiple drive lines and further simultaneously provides driving signals in a next driving cycle to the drive lines overlapping the drive line driven in the previous driving cycle. Accordingly, the SNR of the touch device can be increased and the adverse effect for common ground, i.e. floating status of a human body, occurring between a measuring system and a human body can be reduced so that the multi-finger positioning issue can be resolved.

Other objectives, advantages and novel features of the invention will become more apparent from the following detailed description when taken in conjunction with the accompanying drawings.

BRIEF DESCRIPTION OF THE DRAWINGS

FIG. 10 is a timing sequence diagram of driving signals of a second conventional clustered scan method.

DETAILED DESCRIPTION OF THE INVENTION

The present invention addresses a clustered scan method applied to a capacitive touch device. The capacitive touch device can identify single-finger or multi-finger touch. The present invention can raise a SNR of a sensing value, mitigates the adverse effect caused by common ground between a measuring system and a human body, and further resolve multi-finger positioning problem.

Figure 1:
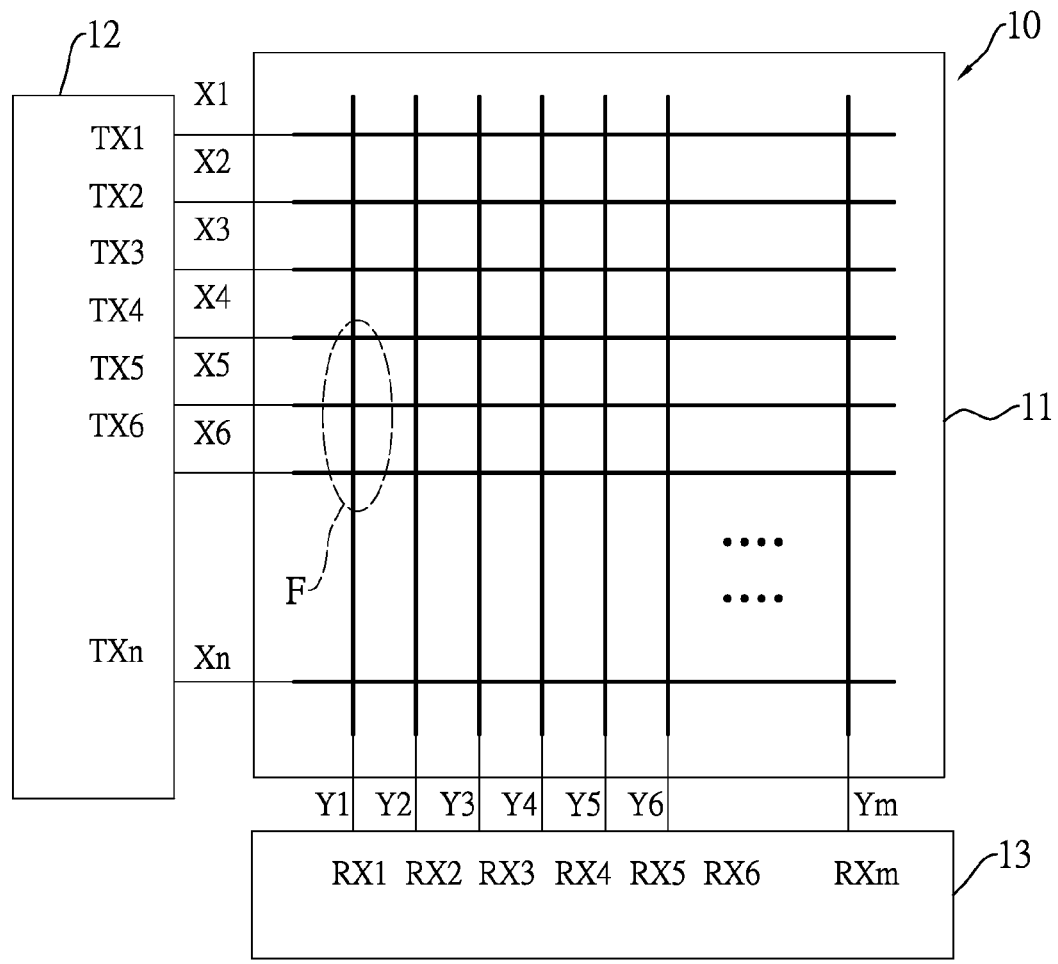
FIG. 1 is a schematic view of a capacitive touch device to which a clustered scan method in accordance with the present invention is applied.

With reference to FIG. 1, a capacitive touch device 10 in accordance with the present invention has a touch panel 11, a driving circuit 12 and a sensing circuit 13. Preferably, the touch panel 11 may be a two-axis touch panel having n drive lines X1~Xn and m sense lines Y1~Ym. The drive lines X1~Xn and the sense lines Y1~Ym are crossed to configure a two dimensional capacitive touch sensor. Each point crossed by a corresponding drive line and a corresponding sense line is taken as a sense point. A clustered scan method in accordance with the present invention has the following steps.

Step one: Simultaneously drive a plurality of the n drive lines in a driving cycle and obtain a sum of a plurality of sensing values at the sense points crossed by the plurality of stimulated drive lines and one of the m sense lines. The plurality of the drive lines to be stimulated includes the $(i-j)^{th}$ drive line to the $(i+k)^{th}$ drive line where i is an index number of the $i^{th}$ drive line and a positive integer between 1 and n, and j and k are zero or positive integer. A relationship among i, j and k is used to determine if the plurality of the drive lines to be stimulated include a bordering drive line. Each drive line is driven by a driving signal. A sum of all driving signals in a same driving cycle is greater than zero.

Step two: Increment i by one and resume the foregoing step until i is equal to n.

Preferably, the relationship among i, j and k for determining if the plurality of the drive lines include a bordering drive line can be implemented as follow.

(1) When j=k=positive even integer, the relationship that (i−j) is less than 1 is used to determine that the plurality of the drive lines to be stimulated includes a bordering drive line, i.e. the first drive line. Thus, choices of driving the first drive line alone or simultaneously driving all the drive lines from the first drive line to the $(i+k)^{th}$ drive line are available to choose.

Likewise, the relationship that (i+k) is greater than n is used to determine that the plurality of the drive lines to be stimulated includes a bordering drive line, i.e. the $n^{th}$ drive line. Thus, the drive lines from the $(i-j)^{th}$ drive line to the $n^{th}$ drive line are driven.

(2) When k and j are unequal positive integer or zero and the absolute value of (k−j) is an odd number, the relationship that (i−j) is less than 1 is used to determine that the plurality of the drive lines to be stimulated includes a bordering drive line, i.e. the first drive line. Thus, choices of driving the first drive line alone or simultaneously driving all the drive lines from the first drive line to the $(i+k)^{th}$ drive line are available to choose. Likewise, the relationship that (i+k) is greater than n is used to determine that the plurality of the drive lines to be stimulated includes a bordering drive line, that is, the $n^{th}$ drive line, the $(i-j)^{th}$ drive line to the $n^{th}$ drive line are driven.

Figure 2:
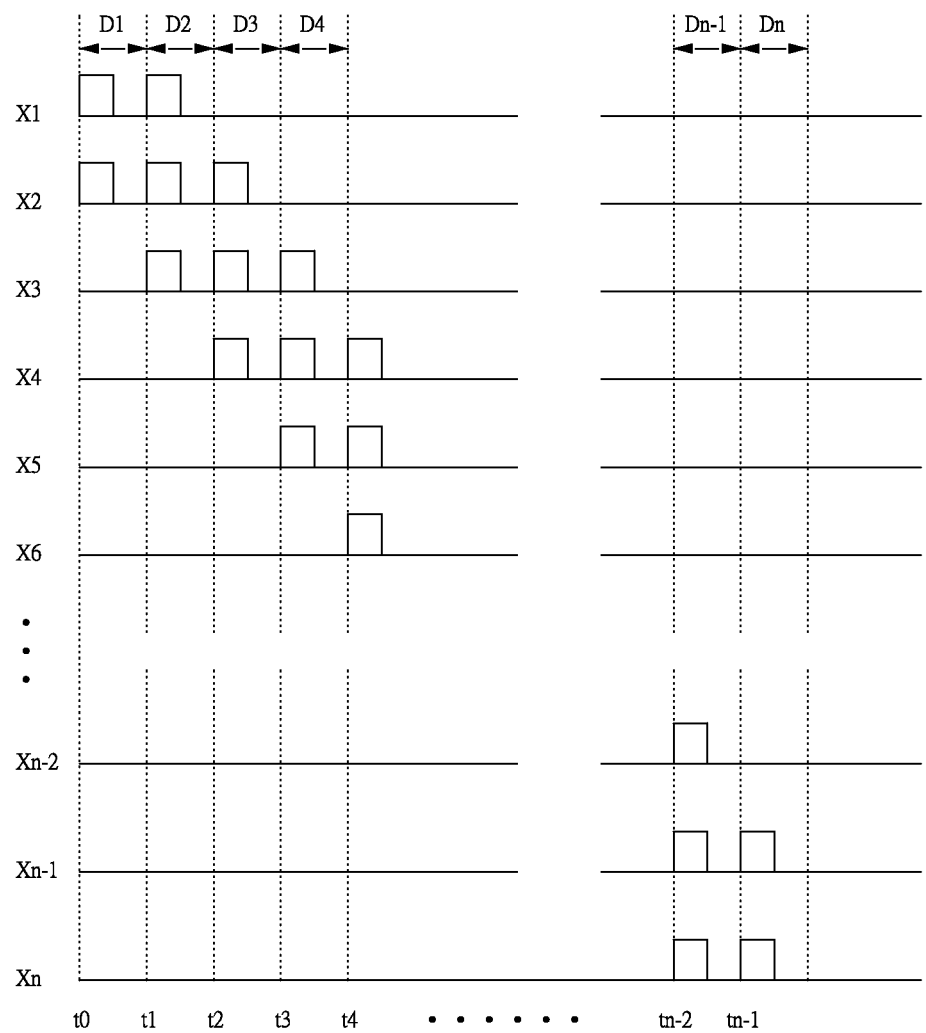
FIG. 2 is a timing sequence diagram of driving signals of a first embodiment of a clustered scan method in accordance with the present invention.

The following examples illustrate different numbers of clusters for in-depth description of the foregoing steps. Each of the numbers of the clusters is greater than 1 and may be an odd number or an even number. With reference to FIG. 2, a first embodiment of a clustered scan method in accordance with the present invention is shown. The number of clusters is chosen to be 3 to explain a process of generating sensing values of the sensing points for an all-points sensing frame. Since the number of clusters is 3 in the present embodiment, to prevent the sensing circuit 13 from sensing no sensing value of each sense line, a preferred approach is to simultaneously provide driving signals with in-phase pulses in a same driving cycle, or to provide driving signals with the diverse voltage levels, which applies the second drive line ($i^{th}$ drive line) with a voltage level greater than that the voltage levels of the driving signals applied to the first drive line and the third drive line.

In the present embodiment, the number of clusters is chosen to be 3, three driving signals with in-phase pulses are applied, and k and j are both equal to 1. When the index number i=1, the bordering first drive line is driven in a first driving cycle D1. The relationship of i−j is determined to be less than 1 so that there are bordering drive line to be included in the plurality of drive lines to be stimulated in the first driving cycle D1. Thus, choices of driving the first drive line alone or driving simultaneously the first drive line to the $(i+k)^{th}$ drive line are available to choose. The second choice means to drive simultaneously the first drive line and the second drive line. The instance of driving the chosen $(i+k)^{th}$ drive line, i.e. the second drive line, can increase the sensing value of the first sense line. In the present embodiment, when i=1, the first to second drive lines X1~X2 are simultaneously driven. The sensing circuit 13 then receives the sensing values between the stimulated drive lines X1~X2 and the first sense line Y1 through the first sense line Y1 and sums all the received sensing values to obtain an ADC (Analog to Digital Conversion) value, which is expressed or denoted by x1+x2=A1, where A1 is the ADC value sensed by the first sense line Y1, and x1 and x2 are the sensing values generated by the drive lines X1, X2 respectively.

Subsequently, the foregoing step one is resumed after i is incremented by one, that is, i=2. The relationship of (i−j) is determined and is equal to 1, which is not less than 1. Thus, the $(i-j)^{th}$ drive line to the $(i+k)^{th}$ drive line are simultaneously driven. In other words, the three in-phase driving signals are respectively applied to the first drive line to the third drive line X1~X3 in a second driving cycle D2 (starting at t1). In this circumstance, since i=2 and j=k=1, the $(i-j)^{th}$ drive line, the $i^{th}$ drive line and the $(i+k)^{th}$ drive line are respectively the drive lines X1~X3. Each driving signal shown in FIG. 2 has a single pulse for illustration purposes. Each driving signal may have multiple pulses with same voltage level or different voltage levels in other practical applications. The sensing circuit 13 then receives the sensing value by the first sense line Y1 corresponding to simultaneous stimulation of the first drive line to the third drive line X1~X3 and sums the sensing values to obtain an ADC value, which is expressed by x1+x2+x3=A2, where A2 is the ADC value sensed by the first sense line Y1, and x1, x2 and x3 are the sensing values generated by the drive lines X1~X3 respectively.

The foregoing step one is resumed again after i is incremented by one, that is, i=3. The simultaneous stimulation is repeated by incrementing the index number i by one until i is equal to n. When i is equal to n, a final index number of the drive lines, and (i+k) is greater than n, the driving signals for driving the $(i+1)^{th}$ drive line to the $(i+k)^{th}$ drive line are disabled. For example, when n=9 and the index number i is incremented to n, i.e. i=9. The determination of the relationship between the index numbers (i, j, or k) is that i+k=9+1=10, and i+k is greater than n (=9), thus, a bordering drive line, i.e. the $n^{th}$ drive line, appears in the plurality of driven lines in the driving cycle Dn. Hence, the $(i-j)^{th}$ drive line to the $n^{th}$ drive are simultaneously driven. In other words, the eighth drive line X8 and the ninth drive line X9 are simultaneously driven. The sensing circuit 13 then receives the sensing values between the first sense line Y1 and the stimulated drive lines X8 and X9 through the first sense line Y1 and sums the sensing values to obtain an ADC value, which is expressed by x8+x9=A9, where A9 is the ADC value, and x8 and x9 are the sensing values generated by the drive lines X8, X9 respectively.

By reading all sensing values by the first sense line Y1 for all the driving cycles, the following equations representing the sums of corresponding sensing values or the ADC values can be obtained as follows.

$$A1 = x1 + x2;$$
$$A2 = x1 + x2 + x3;$$
$$A3 = x2 + x3 + x4;$$
$$\vdots$$
$$A8 = x7 + x8 + x9;$$
$$A9 = x8 + x9;$$

The above simultaneous equations can be rearranged to obtain the following matrix A (n=9).

$$A = \begin{bmatrix} 1 & 1 & 0 & 0 & 0 & 0 & 0 & 0 & 0 \\ 1 & 1 & 1 & 0 & 0 & 0 & 0 & 0 & 0 \\ 0 & 1 & 1 & 1 & 0 & 0 & 0 & 0 & 0 \\ 0 & 0 & 1 & 1 & 1 & 0 & 0 & 0 & 0 \\ 0 & 0 & 0 & 1 & 1 & 1 & 0 & 0 & 0 \\ 0 & 0 & 0 & 0 & 1 & 1 & 1 & 0 & 0 \\ 0 & 0 & 0 & 0 & 0 & 1 & 1 & 1 & 0 \\ 0 & 0 & 0 & 0 & 0 & 0 & 1 & 1 & 1 \\ 0 & 0 & 0 & 0 & 0 & 0 & 0 & 1 & 1 \end{bmatrix}$$

Suppose that the drive line X1 to the drive line X9 are driven by a conventional single-line driving method, a finger F appears on a portion of the first sense line Y1 corresponding to the fourth to sixth drive lines X4~X6 as shown in FIG. 1, and sensing values of all sensing points on the first sense line Y1 driven by the single-line driving method are in a sensing value array expressed by [0 0 0 1 2 1 0 0 0]. The product of the matrix A and the sensing value array is shown as follows.

$$[0\ 0\ 0\ 1\ 2\ 1\ 0\ 0\ 0] \times \begin{bmatrix} 1 & 1 & 0 & 0 & 0 & 0 & 0 & 0 & 0 \\ 1 & 1 & 1 & 0 & 0 & 0 & 0 & 0 & 0 \\ 0 & 1 & 1 & 1 & 0 & 0 & 0 & 0 & 0 \\ 0 & 0 & 1 & 1 & 1 & 0 & 0 & 0 & 0 \\ 0 & 0 & 0 & 1 & 1 & 1 & 0 & 0 & 0 \\ 0 & 0 & 0 & 0 & 1 & 1 & 1 & 0 & 0 \\ 0 & 0 & 0 & 0 & 0 & 1 & 1 & 1 & 0 \\ 0 & 0 & 0 & 0 & 0 & 0 & 1 & 1 & 1 \\ 0 & 0 & 0 & 0 & 0 & 0 & 0 & 1 & 1 \end{bmatrix} =$$

$$[0\ 0\ 1\ 3\ 4\ 3\ 1\ 0\ 0]$$

The highest sensing value of the first sense line Y1 is located on a sensing point (X5, Y1), which is a point intersected by the fifth drive line X5 and the first sense line Y1. The sensing values of the conventional single-line driving method are thus increased because the peak sensing value at (X5, Y1) obtained by driving with the single-line driving method is 2 and a difference value between the peak sensing value and a sensing value at a sensing point at the absence of any finger is 2 in contrast to a difference value 4 obtained by the scanning method of the present invention. Accordingly, the sensing values obtained by the sensing circuit 13 can truly reflect the position of the finger and also increase the SNR.

After the m sense lines are similarly processed, the sensing values of the sensing points on all the sense lines crossed by all the drive lines can be obtained for determination of finger's position.

Figure 3:
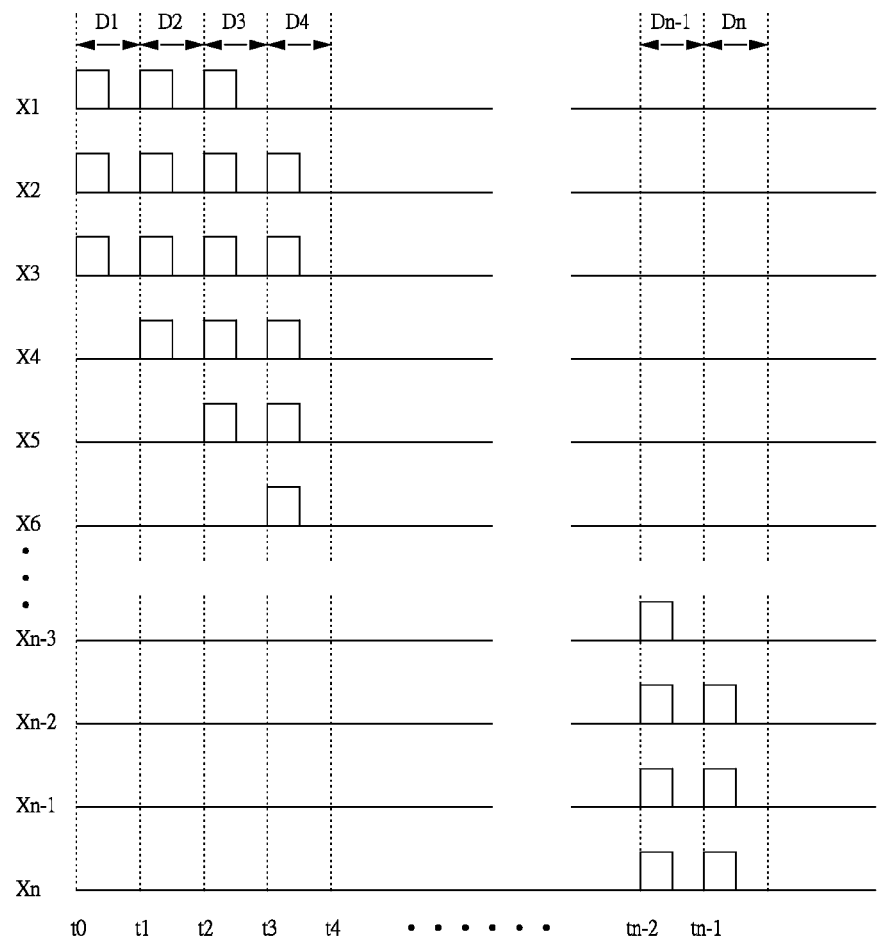
FIG. 3 is a timing sequence diagram of driving signals of a second embodiment of a clustered scan method in accordance with the present invention.
Figure 4:
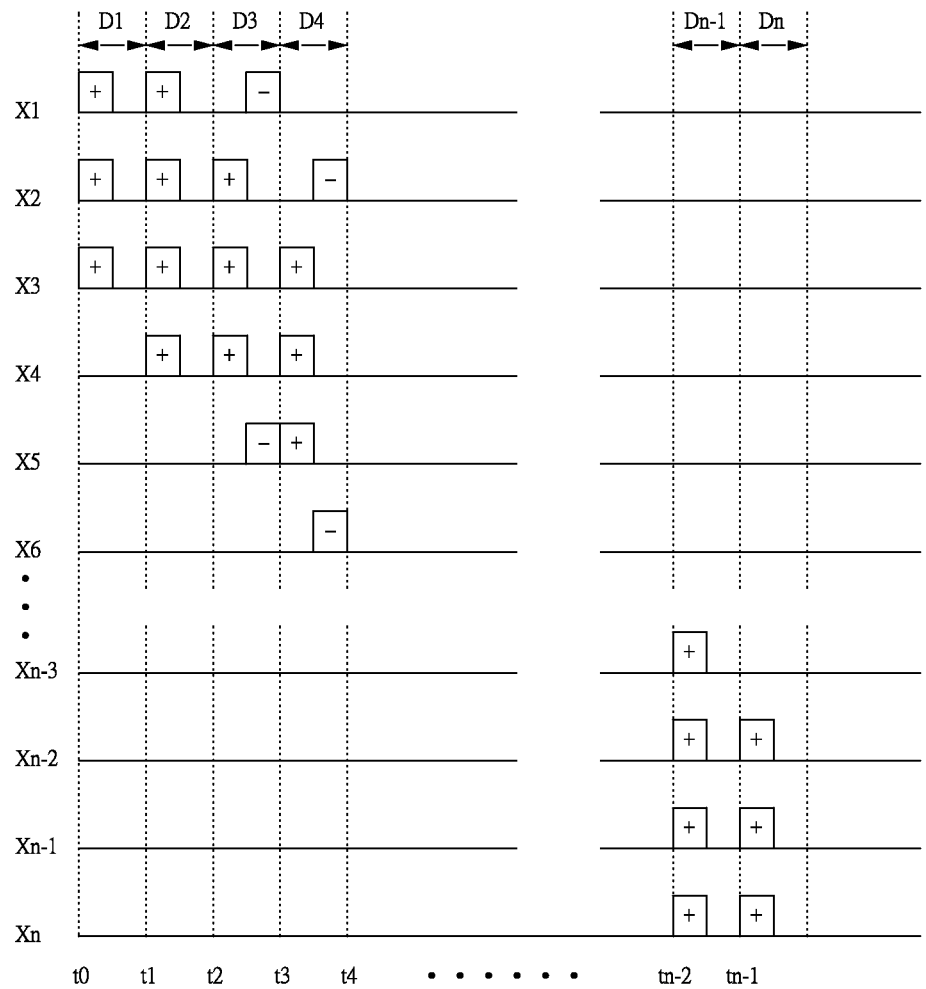
FIG. 4 is a timing sequence diagram of driving signals of a third embodiment of a clustered scan method in accordance with the present invention.

With reference to FIGS. 1 and 3, a second embodiment of a clustered scan method in accordance with the present invention is shown. The number of clusters is chosen to be 5. To prevent the sensing circuit 13 from sensing no sensing values of each sense line during each driving cycle, there are several preferred approaches. In the present embodiment, five driving signals with in-phase pulses are chosen. With reference to FIG. 4, a third embodiment of a clustered scan method in accordance with the present invention is shown. Five driving signals in each driving cycle can be adjusted to have 180-degree or zero-degree phase shift between two driving signals of each adjacent two of the drive lines. When the phase shift is zero or 180 degrees, the phase shift determines the sign of one of the two driving signals.

Figure 5:
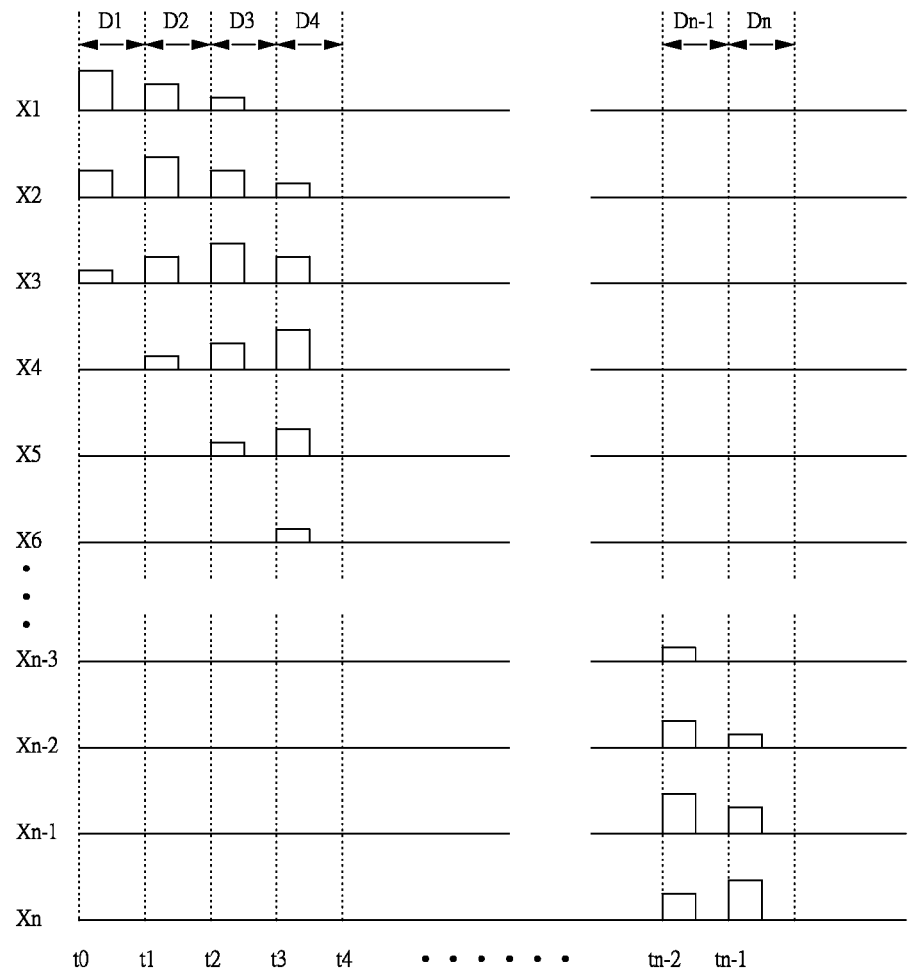
FIG. 5 is a timing sequence diagram of driving signals of a fourth embodiment of a clustered scan method in accordance with the present invention.

With reference to FIG. 5, a fourth embodiment of a clustered scan method in accordance with the present invention is shown. Five driving signals with in-phase pulses in each cycle can be adjusted to have different voltage levels. Preferably, the voltage level of the driving signal driving a middle drive line in each driving cycle has the highest voltage level while the voltage levels of the driving signals driving the first two drive lines and the last two drive lines symmetrically decreases from the voltage level of the driving signal driving the middle drive line. The foregoing three approaches in FIGS. 3 to 5 satisfy a condition that a sum of all driving signals in each identical driving cycle is greater than zero.

With further reference to FIG. 4, the number of clusters is chosen to be five and k and j are both equal to a positive number, 2. When the first sense line at a bordering position is driven in the first driving cycle D1, that is i=1, the relationship of (i−j) is determined to be less than 1 and the first drive line is driven alone or the first drive line to the (i+k)$^{th}$ drive line are simultaneously driven. In the present embodiment, the choice of simultaneously driving the first drive line to the (i+k)$^{th}$ drive line is given for description. In other words, the first drive line X1 to the third drive line X3 are simultaneously driven for the sensing circuit 13 to receive the sensing values between the stimulated lines X1~X3 and the first sense line Y1 through the first sense line Y1 and sum all the received sensing values to obtain an ADC value, which is x1+x2+x3=A1, where A1 is the ADC value sensed by the first sense line Y1 and x1~x3 are the sensing values generated by the drive lines X1~X3 respectively.

Subsequently, the foregoing step is resumed after i is incremented by one. In the second driving cycle D2, that is i=2, the relationship of (i−j) is determined to be less than 1. In the present embodiment, when i=2, the first drive line to the fourth drive line X1~X4 are simultaneously driven, and the sensing circuit 13 receives the sensing values between the stimulated drive lines X1~X4 and the first sense line Y1 through the first sense line Y1 and sums the received sensing values to obtain an ADC value, which is expressed by x1+x2+x3+x4=A2, where A2 is the ADC value sensed by the first sense line Y1 and x1~x4 are the sensing values generated by the drive lines X1~X4 respectively.

The first step is resumed after i is further incremented by one. In the third driving cycle D3, that is i=3, the relationship of (i−j) is determined to be not less than 1 and no bordering drive line is driven. In other words, five driving signals that are out of phase with one another are simultaneously applied to the first drive line to the fifth drive line X1~X5, which are the (i−j) drive line to the (i+k) drive line, in the third driving cycle D3 (at the time t2). Meanwhile, the sensing circuit 13 receives the sensing value between the stimulated drive lines X1~X5 and the first sense line Y1 through the first sense line Y1 and sum all the received sensing values to obtain an ADC value, which is expressed by −x1+x2+x3+x4−x5=A3, where A3 is the ADC value sensed by the first sense line Y1 and x1~x5 are the sensing values generated by the drive lines X1~X5 respectively.

Similarly, the first step is resumed each time after i (i=4, . . . , n) is incremented by one. When (i+k) is determined to be greater than n, a bordering drive line, that is, the n$^{th}$ drive line, is driven. For example, when n=9 and i=8, (i+k), that is, 8+2=10, is determined to be greater than n (n=9), the sixth drive line X6 to the ninth drive line X9 are driven only. The sensing circuit 13 receives the sensing value between the stimulated drive lines X6~X9 and the first sense line Y1 through the first sense line Y1 and sums all the received sensing values to obtain an ADC value, which is expressed by x6+x7+x8+x9=A8, where A8 is the ADC value sensed by the first sense line Y1 and x6~x9 are the sensing values generated by the drive lines X6~X9 respectively.

When n=9 and i=9, the relationship of (i+k), that is, 9+2=11, is determined to be greater than n (n=9), the sixth drive line X7 to the ninth drive line X9 are driven only. The sensing circuit 13 receives the sensing value between the stimulated drive lines X7~X9 and the first sense line Y1 through the first sense line Y1 and sums all the received sensing values to obtain an ADC value, which is expressed by x7+x8+x9=A9, where A9 is the ADC value sensed by the first sense line Y1 and x7~x9 are the sensing values generated by the drive lines X7~X9 respectively.

By reading all sensing values by the first sense line Y1 for all the driving cycles, the following equations representing the sums of corresponding sensing values or the ADC values can be obtained as follows.

$$A1 = x1 + x2 + x3;$$
$$A2 = x1 + x2 + x3 + x4;$$
$$A3 = -x1 + x2 + x3 + x4 - x5;$$
$$\vdots$$
$$A8 = x6 + x7 + x8 + x9;$$
$$A9 = x7 + x8 + x9;$$

The above simultaneous equations can be rearranged to obtain the following matrix A (n=9).

$$A = \begin{bmatrix} 1 & 1 & -1 & 0 & 0 & 0 & 0 & 0 & 0 \\ 1 & 1 & 1 & -1 & 0 & 0 & 0 & 0 & 0 \\ 1 & 1 & 1 & 1 & -1 & 0 & 0 & 0 & 0 \\ 0 & 1 & 1 & 1 & 1 & -1 & 0 & 0 & 0 \\ 0 & 0 & -1 & 1 & 1 & 1 & -1 & 0 & 0 \\ 0 & 0 & 0 & -1 & 1 & 1 & 1 & 1 & 0 \\ 0 & 0 & 0 & 0 & -1 & 1 & 1 & 1 & 1 \\ 0 & 0 & 0 & 0 & 0 & -1 & 1 & 1 & 1 \\ 0 & 0 & 0 & 0 & 0 & 0 & -1 & 1 & 1 \end{bmatrix}$$

Suppose a finger F appears on a portion of the first sense line Y1 corresponding to the fourth to sixth drive lines X4~X6 as shown in FIG. 1. After all the drive lines are scanned by the clustered scan method of the present invention, the sensing values of all the sensing points on the first sense line Y1 can be obtained by the following product of the matrices. Likewise, the highest sensing value of the first sense line Y1 is located on a sensing point (X5, Y1), which is a point intersected by the fifth drive line X5 and the first sense line Y1. Accordingly, the sensing values obtained by the sensing circuit 13 can truly reflect the position of the finger F.

$$[0\ 0\ 0\ 1\ 2\ 1\ 0\ 0\ 0] \times \begin{bmatrix} 1 & 1 & -1 & 0 & 0 & 0 & 0 & 0 & 0 \\ 1 & 1 & 1 & -1 & 0 & 0 & 0 & 0 & 0 \\ 1 & 1 & 1 & 1 & -1 & 0 & 0 & 0 & 0 \\ 0 & 1 & 1 & 1 & 1 & -1 & 0 & 0 & 0 \\ 0 & 0 & -1 & 1 & 1 & 1 & -1 & 0 & 0 \\ 0 & 0 & 0 & -1 & 1 & 1 & 1 & 1 & 0 \\ 0 & 0 & 0 & 0 & -1 & 1 & 1 & 1 & 1 \\ 0 & 0 & 0 & 0 & 0 & -1 & 1 & 1 & 1 \\ 0 & 0 & 0 & 0 & 0 & 0 & -1 & 1 & 1 \end{bmatrix} =$$

$$[0\ 1\ -1\ 2\ 4\ 2\ -1\ 1\ 0]$$

After the m sense lines are similarly processed, the sensing values of the sensing points on all the sense lines crossed by all the drive lines can be obtained for determination of finger's position.

Figure 6:
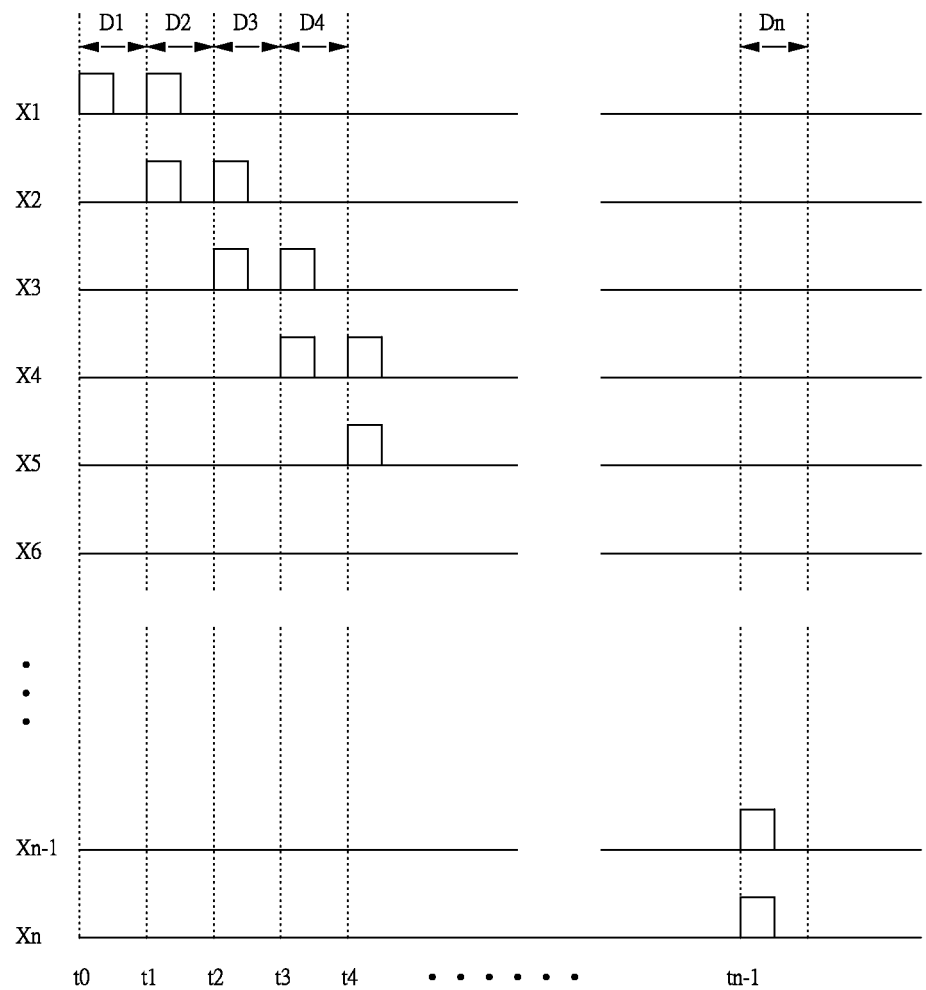
FIG. 6 is a timing sequence diagram of driving signals of a fifth embodiment of a clustered scan method in accordance with the present invention.

With further reference to FIGS. 1 and 6, a fifth embodiment of a clustered scan method in accordance with the present invention is shown. The number of clusters is chosen to be 2 and k and j are equal to 0 and 1 respectively. In the present embodiment, two in-phase driving signals are simultaneously applied in each identical driving cycle. The voltage levels of the two driving signals may differ from each other.

When the two in-phase driving signals are applied and the first sense line at a bordering position is driven in the first driving cycle D1, that is i=1, the relationship of (i−j) is determined to be less than 1 and the first drive line is driven alone because k=0. The sensing circuit 13 receives the sensing value between the stimulated first drive line X1 and the first sense line Y1 through the first sense line Y1 and obtains an ADC value, which is expressed by x1=A1, where A1 is the ADC value sensed by the first sense line Y1 and x1 is the sensing values generated by the first drive line X1.

Subsequently, the foregoing step is resumed after i is incremented by one, that is i=2. In the second driving cycle D2, the two in-phase driving signals are simultaneously applied to the first drive lien X1 and the second drive line X2, that is, the $(i-j)^{th}$ and $i^{th}$ driving lines. The sensing circuit 13 receives the sensing values between the stimulated drive lines X1, X2 and the first sense line Y1 through the first sense line Y1 and sums the received sensing values to obtain an ADC value, which is expressed by x1+x2=A2, where A2 is the ADC value sensed by the first sense line Y1 and x1, x2 are the sensing values generated by the drive lines X1~X2 respectively.

The first step is resumed after i is further incremented by one. In the third driving cycle D3, that is i=3. The scanning process continues until i=n. As a bordering drive line only appears when (i+k) is greater than n, the condition (i+k>n) can never be met since k=0. Hence, when i=n, the eighth drive line X8 and the ninth drive line are driven only. The sensing circuit 13 receives the sensing value between the stimulated drive lines X8~X9 and the first sense line Y1 through the first sense line Y1 and sums all the received sensing values to obtain an ADC value, which is expressed by x8+x9=A9, where A9 is the ADC value sensed by the first sense line Y1 and x8 and x9 are the sensing values generated by the drive lines X8 and X9 respectively.

By reading all sensing values by the first sense line Y1 for all the driving cycles, the following equations representing the sums of corresponding sensing values or the ADC values can be obtained as follows.

$$A1 = x1;$$
$$A2 = x1 + x2;$$
$$A3 = x2 + x3;$$
$$\vdots$$
$$A8 = x7 + x8;$$
$$A9 = x8 + x9;$$

The above simultaneous equations can be rearranged to obtain the following matrix A (n=9).

$$A = \begin{bmatrix} 1 & 1 & 0 & 0 & 0 & 0 & 0 & 0 & 0 \\ 0 & 1 & 1 & 0 & 0 & 0 & 0 & 0 & 0 \\ 0 & 0 & 1 & 1 & 0 & 0 & 0 & 0 & 0 \\ 0 & 0 & 0 & 1 & 1 & 0 & 0 & 0 & 0 \\ 0 & 0 & 0 & 0 & 1 & 1 & 0 & 0 & 0 \\ 0 & 0 & 0 & 0 & 0 & 1 & 1 & 0 & 0 \\ 0 & 0 & 0 & 0 & 0 & 0 & 1 & 1 & 0 \\ 0 & 0 & 0 & 0 & 0 & 0 & 0 & 1 & 1 \\ 0 & 0 & 0 & 0 & 0 & 0 & 0 & 0 & 1 \end{bmatrix}$$

Suppose a finger F appears on a portion of the first sense line Y1 corresponding to the fourth to sixth drive lines X4~X6 as shown in FIG. 1. The sensing values of all the sensing points on the first sense line Y1 can be obtained by the following product of the matrices. The highest sensing value of the first sense line Y1 is located on two sensing points, which are two points of the first sense line Y1 intersected by the fifth drive line X5 and the sixth drive line X6. After scanning this way, the sensing values of all sensing points on each sense line look the same. Accordingly, in collaboration with subsequent calibration, the finger's position can still be normally identified.

$$[0\ 0\ 0\ 1\ 2\ 1\ 0\ 0\ 0] \times \begin{bmatrix} 1 & 1 & 0 & 0 & 0 & 0 & 0 & 0 & 0 \\ 0 & 1 & 1 & 0 & 0 & 0 & 0 & 0 & 0 \\ 0 & 0 & 1 & 1 & 0 & 0 & 0 & 0 & 0 \\ 0 & 0 & 0 & 1 & 1 & 0 & 0 & 0 & 0 \\ 0 & 0 & 0 & 0 & 1 & 1 & 0 & 0 & 0 \\ 0 & 0 & 0 & 0 & 0 & 1 & 1 & 0 & 0 \\ 0 & 0 & 0 & 0 & 0 & 0 & 1 & 1 & 0 \\ 0 & 0 & 0 & 0 & 0 & 0 & 0 & 1 & 1 \\ 0 & 0 & 0 & 0 & 0 & 0 & 0 & 0 & 1 \end{bmatrix} =$$

$$[0\ 0\ 0\ 1\ 3\ 3\ 1\ 0\ 0]$$

Figure 7:
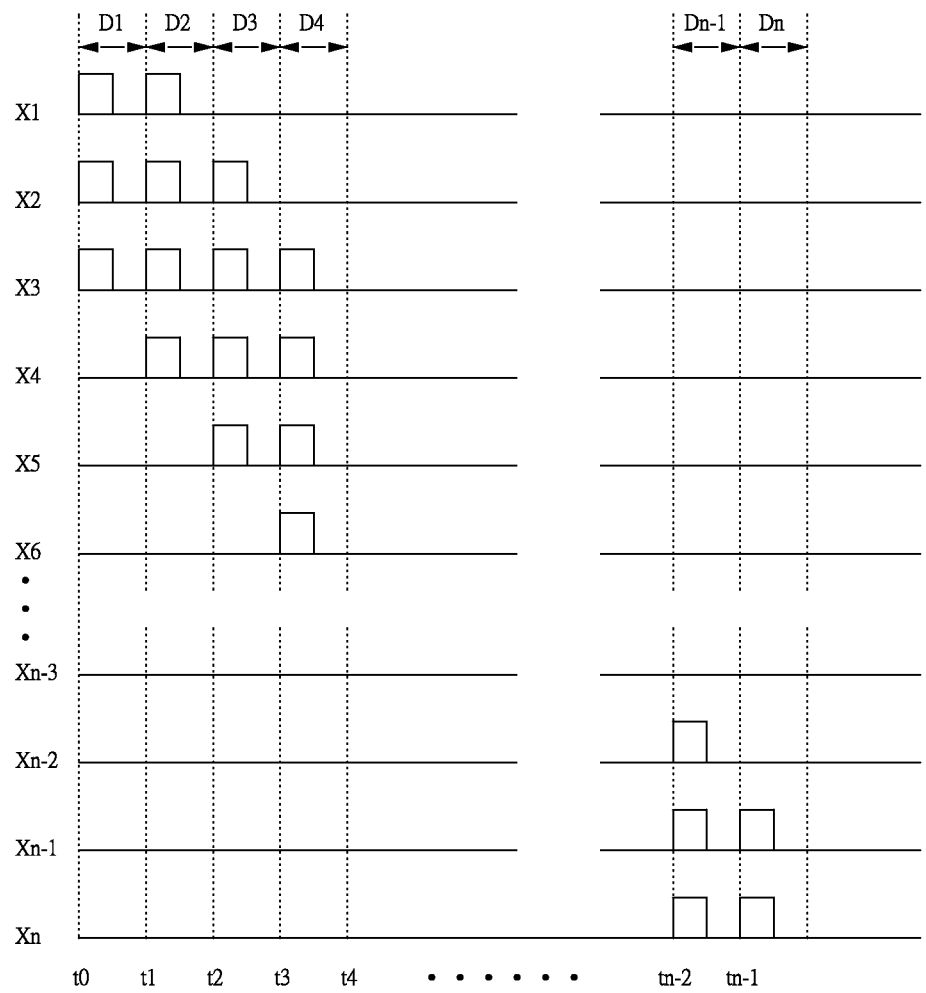
FIG. 7 is a timing sequence diagram of driving signals of a sixth embodiment of a clustered scan method in accordance with the present invention.

With further reference to FIG. 7, the number of clusters is chosen to be four and k and j are equal to 2 and 1 respectively. When the first sense line at a bordering position is driven in the first driving cycle D1, that is i=1, the relationship of (i−j) is determined to be less than 1 and the first drive line is driven alone or the first drive line to the $(i+k)^{th}$ drive line are simultaneously driven. In the present embodiment, simultaneously driving the first drive line to the $(i+k)^{th}$ drive line is selected to increase the sensing values of the first sense line. In other words, the first drive line X1 to the third drive line X3 are simultaneously driven for the sensing circuit 13 to receive the sensing values between the stimulated drive lines X1~X3 and the first sense line Y1 through the first sense line Y1 and sum all the received sensing values to obtain an ADC value, which is expressed by x1+x2+x3=A1, where A1 is the ADC value sensed by the first sense line Y1 and x1~x3 are the sensing values generated by the drive lines X1~X3 respectively.

Subsequently, the foregoing step is resumed after i is incremented by one. In the second driving cycle D2, that is i=2, the relationship of (i−j) is determined to be not less than 1 and no bordering drive line is driven. Hence, the driving signals for driving the $(i−j)^{th}$ drive line to the $(i+k)^{th}$ drive line are simultaneously applied. In other words, four in-phase driving signals are simultaneously applied to the first drive line to the fourth drive line X1~X4 and the sensing circuit 13 receives the sensing values between the stimulated drive lines X1~X4 and the first sense line Y1 through the first sense line Y1 and sums the received sensing values to obtain an ADC value, which is expressed by x1+x2+x3+x4=A2, where A2 is the ADC value sensed by the first sense line Y1 and x1~x4 are the sensing values generated by the drive lines X1~X4 respectively.

The first step is repeatedly resumed after i (i=3, . . . , n) is further incremented by one. When the relationship of (i+k) is determined to be greater than n, a bordering drive line is driven. For example, when i=8 (assuming that n=9), a bordering drive line is driven because the condition (i+k)>n is met. The seventh to ninth drive lines X7~X9 are driven only. The sensing circuit 13 receives the sensing values between the stimulated drive lines X7~X9 and the first sense line Y1 through the first sense line Y1 and sums all the received sensing values to obtain an ADC value, which is expressed by x7+x8+x9=A8, where A8 is the ADC value sensed by the first sense line Y1 and x7~x9 are the sensing values generated by the drive lines X7~X9 respectively.

Similarly, when i=n, the condition (i+k)>n is met and a bordering drive line is driven. Hence, the eighth drive line X8 and the ninth drive line X9 are driven only. The sensing circuit 13 then receives the sensing value between the stimulated drive lines X8~X9 and the first sense line Y1 through the first sense line Y1 and sums all the received sensing values to obtain an ADC value, which is expressed by x8+x9=A9, where A9 is the ADC value sensed by the first sense line Y1 and x8, x9 are the sensing values generated by the drive lines X8 and X9 respectively.

By reading all sensing values by the first sense line Y1 for all the driving cycles, the following equations representing the sums of corresponding sensing values or the ADC values can be obtained as follows.

$$A1 = x1 + x2 + x3;$$
$$A2 = x1 + x2 + x3 + x4;$$
$$A3 = -x2 + x3 + x4 - x5;$$
$$\vdots$$
$$A8 = x7 + x8 + x9;$$
$$A9 = x8 + x9;$$

The above simultaneous equations can be rearranged to obtain the following matrix A (n=9).

$$A = \begin{bmatrix} 1 & 1 & 0 & 0 & 0 & 0 & 0 & 0 & 0 \\ 1 & 1 & 1 & 0 & 0 & 0 & 0 & 0 & 0 \\ 1 & 1 & 1 & 1 & 0 & 0 & 0 & 0 & 0 \\ 0 & 1 & 1 & 1 & 1 & 0 & 0 & 0 & 0 \\ 0 & 0 & 1 & 1 & 1 & 1 & 0 & 0 & 0 \\ 0 & 0 & 0 & 1 & 1 & 1 & 1 & 0 & 0 \\ 0 & 0 & 0 & 0 & 1 & 1 & 1 & 1 & 0 \\ 0 & 0 & 0 & 0 & 0 & 1 & 1 & 1 & 1 \\ 0 & 0 & 0 & 0 & 0 & 0 & 1 & 1 & 1 \end{bmatrix}$$

Suppose a finger F appears on a portion of the first sense line Y1 corresponding to the fourth to sixth drive lines X4~X6 as shown in FIG. 1. After all the drive lines are scanned by the clustered scan method of the present invention, the sensing values of all the sensing points on the first sense line Y1 can be obtained by the following product of the matrices. The highest sensing value of the first sense line Y1 is located on two sensing points, which are two points of the first sense line Y1 intersected by the fourth drive line X4 and the fifth drive line X5. After scanning this way, the sensing values of all sensing points on each sense line look the same. Accordingly, in collaboration with subsequent calibration, the finger's position can still be normally identified.

$$[0\ 0\ 0\ 1\ 2\ 1\ 0\ 0\ 0] \times \begin{bmatrix} 1 & 1 & 0 & 0 & 0 & 0 & 0 & 0 & 0 \\ 1 & 1 & 1 & 0 & 0 & 0 & 0 & 0 & 0 \\ 1 & 1 & 1 & 1 & 0 & 0 & 0 & 0 & 0 \\ 0 & 1 & 1 & 1 & 1 & 0 & 0 & 0 & 0 \\ 0 & 0 & 1 & 1 & 1 & 1 & 0 & 0 & 0 \\ 0 & 0 & 0 & 1 & 1 & 1 & 1 & 0 & 0 \\ 0 & 0 & 0 & 0 & 1 & 1 & 1 & 1 & 0 \\ 0 & 0 & 0 & 0 & 0 & 1 & 1 & 1 & 1 \\ 0 & 0 & 0 & 0 & 0 & 0 & 1 & 1 & 1 \end{bmatrix} =$$

$$[0\ 1\ 3\ 4\ 4\ 3\ 1\ 0\ 0]$$

With reference to following table, after a single-line driving method and the clustered scan method in FIG. 2 are used to scan a touch panel with or without noise source added thereto, SNR information measured associated with the touch panel is shown. From the table, the SNR obtained with the present invention is better than that obtained with the single-line driving method.

| Noise source (Test copper rod with a diameter 9 mm) | Single-line driving method | Clustered scan method (number of clusters = 3) |
|---|---|---|
| No noise source added | 166.25 | 215.33 |
| Noise source added (amplitude 14 V) | 16.15 | 43.24 |

Another embodiment of the present invention is to drive bordering drive lines using a single-line driving method for further mitigating the adverse effect caused by common ground between a measuring system and a human body.

For example, a scan method of the present invention is applied to a touch panel with n drive lines to scan the touch panel under a single-line driving mode and double-line driving mode.

During the single-line driving mode, a positive driving signal is used to drive bordering drive lines, such as the first drive line Y1. When n is an odd number, the bordering drives can further include the last drive line, that is, the $n^{th}$ drive line. During the double-line driving mode, the $i^{th}$ drive line and the $(i+k)^{th}$ drive line are simultaneously driven in a driving cycle and two second sensing values of a sense line corresponding to the two drive lines are obtained. The previous step is repeated after i is incremented by one until i is equal to n where i is a positive integer in a range of 1~n and k=1. Each drive line is driven by a second driving signal. The two driving signals in the same driving cycles are opposite in sign, such as two driving signals respectively having a positive voltage and a negative voltage or 180-degree phase shift.

Figure 8A:
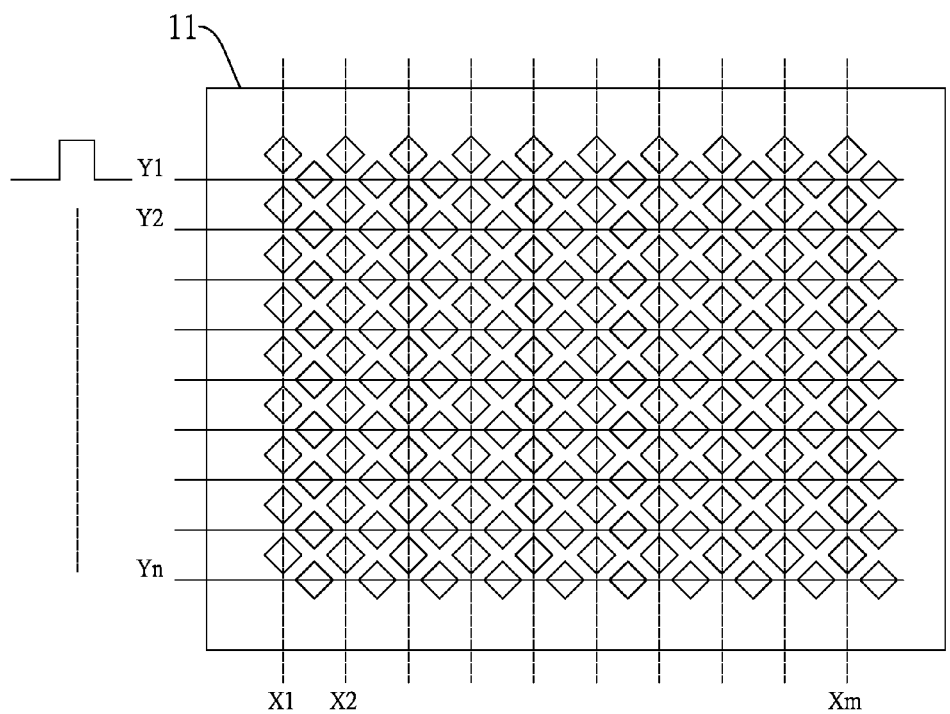
FIGS. 8A to 8C are timing sequence diagrams of driving signals of a sixth embodiment of a clustered scan method in accordance with the present invention.
Figure 8B:
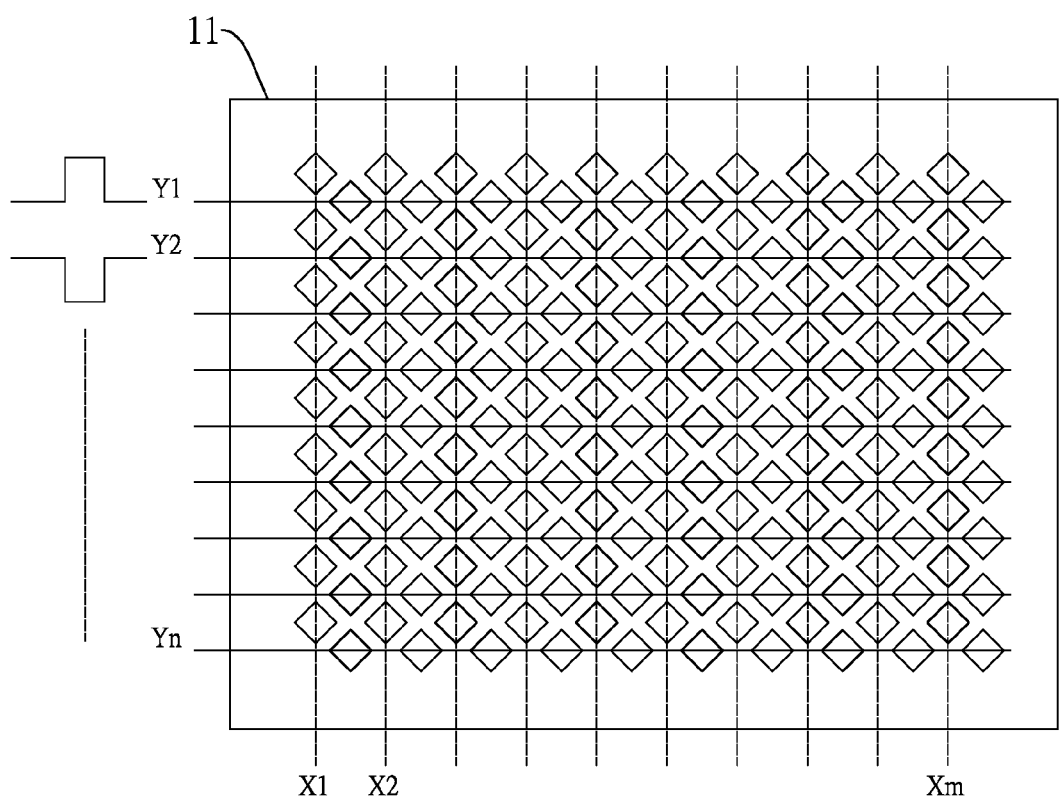
Figure 8C:
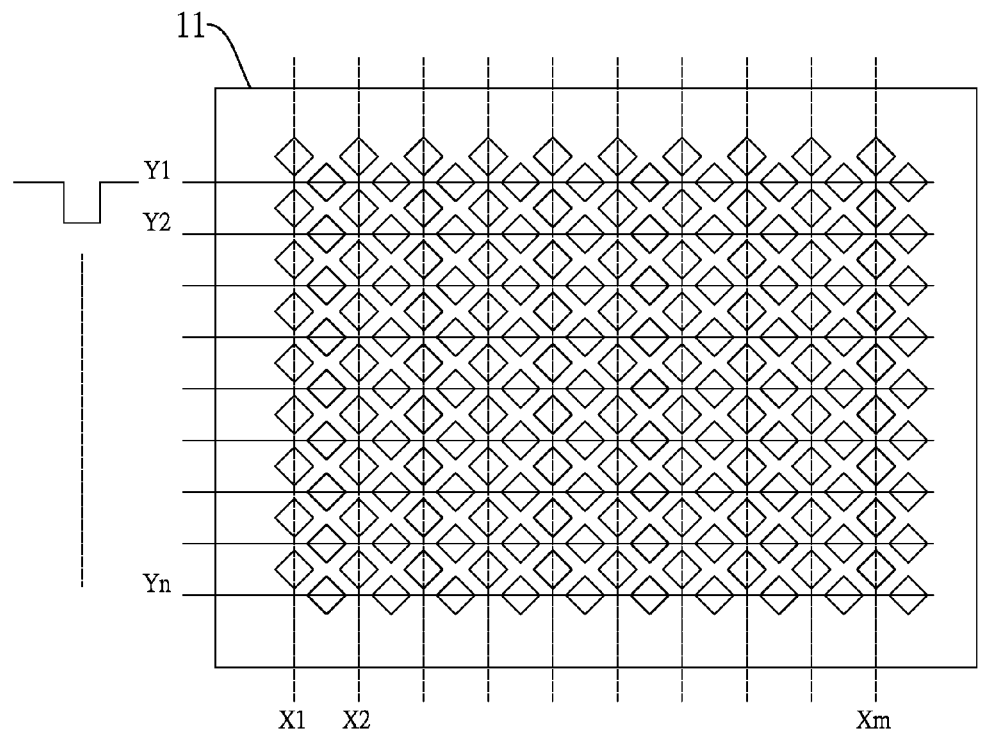
Figure 9A:
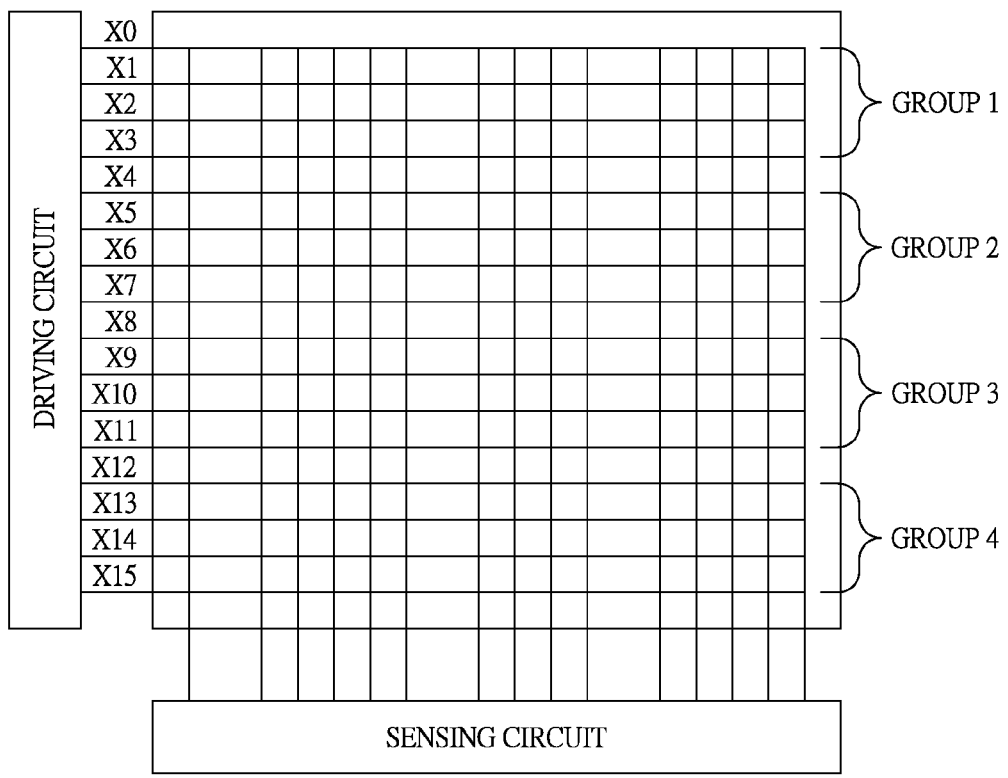
FIG. 9A is a schematic view of a conventional capacitive touch device to which a conventional clustered scan method is applied.
Figure 9B:
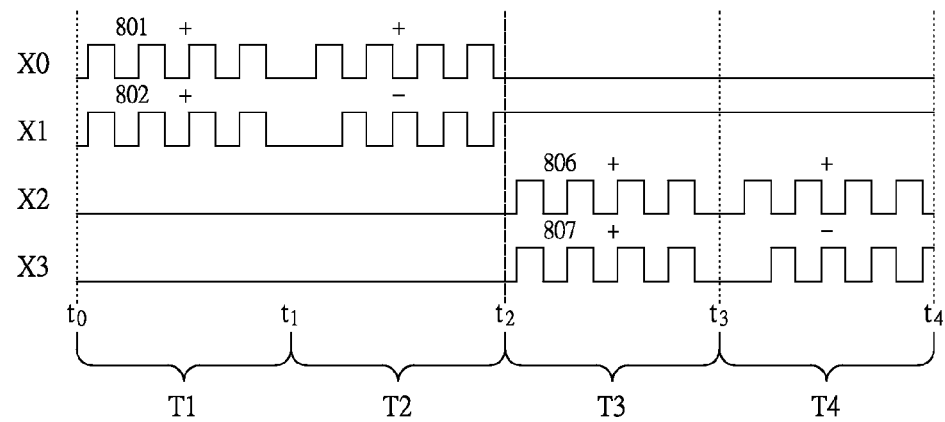
FIG. 9B is a timing sequence diagram of driving signals of a first conventional clustered scan method
Figure 11:
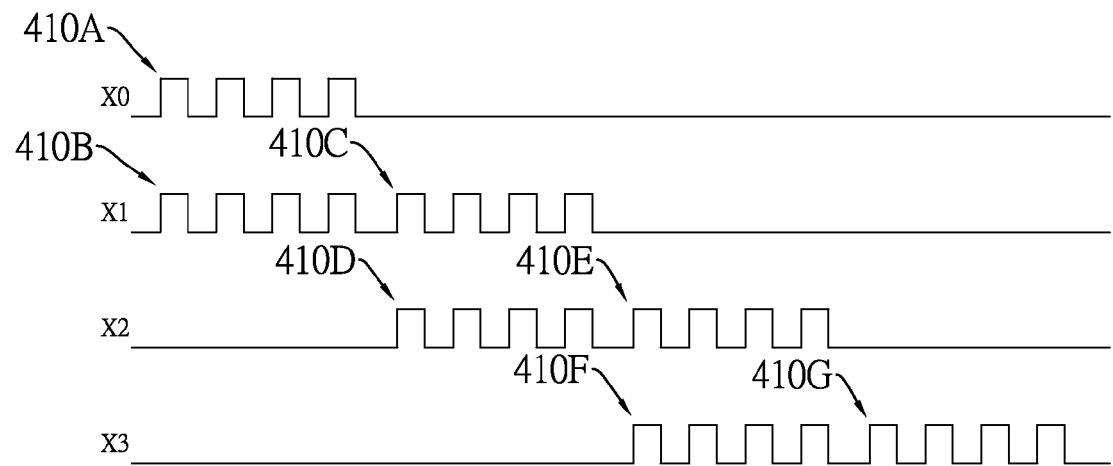
FIG. 11 is a timing sequence diagram of driving signal of a third conventional clustered scan method.

With reference to FIG. 8A or FIG. 8c, conventional single-line driving methods employ a driving signal with a positive-voltage waveform or a negative-voltage waveform to sequentially drive all the drive lines. With reference to FIG. 8A, the clustered scan method in accordance with the present invention adopts single-line driving mode to drive a bordering drive line, such as the first drive line Y1, with a positive driving signal and obtain a sensing value, that is, Y1=A1. With reference to 8B, during the double-line driving mode, when i=1, the first drive line Y1 and the second drive line are driven and a sensing value, that is, Y1-Y2=A2, can be obtained. When i=2, the second drive line Y2 and the third drive line Y3 are driven and a sensing value, that is, Y2-Y3=A3, can be obtained. Similarly, the rest of sensing values can be obtained as follows:

$$A2 = Y1 - Y2;$$
$$A3 = Y2 - Y3;$$
$$\vdots$$
$$An = Yn-1 - Yn;$$

where Y1 to Yn are the sensing values between the stimulated drive lines Y1 to Yn and the sense line X1 through the sense line X1, and A1 to An are the ADC values of the sensing values.

The equation Y1=A1 obtained by the single-line driving mode can be substituted in the simultaneous equations generated by the double-line driving mode to solve all the sensing values generated by each drive line. As the double-line driving mode adopts a positive driving signal and a negative driving signal, the sensing values generated by the driving signals are mutually cancelled out when there is no object on the touch panel while variation of sensing value occurs when there is an object on the touch panel. Additionally, with the sensing value obtained from the conventional single-line driving method as shown in FIG. 8A or 8C, the sensitivity of identifying a touch signal can be increased and an indication representing that human body and touch system are well-grounded can be also provided. In the present embodiment, the positive and negative driving signals respectively have a positive-voltage waveform and a negative-voltage waveform. Preferably, during each driving cycle, a driving signal with a positive-voltage waveform is outputted to the $i^{th}$ drive line, and a driving signal with a negative-voltage waveform is outputted to the $(i+k)^{th}$ drive line. Besides, the first driving signal and the second driving signal can have a 180-degree phase shift.

In the present embodiment, when the first driving signal is outputted to the first drive line under the single-line driving mode, the rest of drive lines are grounded or floating. As to the double-line driving mode, during each driving cycle, a first driving signal with a positive-voltage waveform can be outputted to the $i^{th}$ drive line, and a second driving signal with a negative-voltage waveform is outputted to the $(i+k)^{th}$ drive line.

From the foregoing embodiments, the clustered scan method of the present invention simultaneously provides driving signals to multiple drive line in one driving cycle, and also provides driving signals to partial drive lines in the previous one driving cycle when simultaneously providing driving signals to multiple drive lines in a next driving cycle to ensure that a sum of all driving signals provided all driving cycles are greater than zero for the benefit of effective sensing signals detected on corresponding sense lines. Accordingly, the clustered scan method of the present invention can increase the SNR, mitigate the floating effect (i.e. a common ground condition) of the measuring system and human body, and resolve multi-finger positioning issues.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A clustered scan method of a capacitive touch device with n drive lines and m sense lines, the method comprising steps of:
   simultaneously driving multiple drive lines selected from the n drive lines in a driving cycle, wherein the multiple drive lines include the drive lines of a $(i-j)^{th}$ drive line to a $(i+k)^{th}$ drive line, and obtaining a sum of a plurality of sensing values corresponding respectively to the plurality of stimulated drive lines through one of the sense lines; and
   incrementing i by one and resuming the step of simultaneously driving the multiple drive lines;
   wherein i is a positive integer between 1 and n, and j and k are zero or positive integers, each of the multiple drive lines is driven by a driving signal, and a sum of all the driving signals in the driving cycle is greater than zero;
   when a number of the multiple drive lines simultaneously driven in the driving cycle is odd, k and j are equal positive integers;
   wherein
   when $(i-j)$ is less than 1, the first drive line is driven only or the first drive line to the $(i+k)^{th}$ drive line are simultaneously driven; and
   when $(i+k)$ is greater than n, the $(i-j)^{th}$ drive line to the $n^{th}$ drive line are simultaneously driven.

2. The clustered scan method as claimed in claim 1, wherein each driving signal has a phase, and adjacent two of all the driving signals in the driving cycle have a phase shift.

3. The clustered scan method as claimed in claim 2, wherein when the phase shift between the two driving signals of each adjacent two of the drive lines is zero degrees or 180 degrees, the phase shift determines a positive sign or a negative sign of one of the adjacent two driving signals.

4. The clustered scan method as claimed in claim 1, wherein each driving signal in the driving cycle has a voltage level, and the voltage of the driving signal for driving the $i^{th}$ drive line differs from the voltage of the driving signal for driving the $(i+k)^{th}$ drive line or for driving the $(i-j)^{th}$ drive line.

5. The clustered scan method as claimed in claim 1, wherein both k and j are equal to 1, 2 or 4.

6. The clustered scan method as claimed in claim 5, wherein when both k and j are equal to a positive integer, the driving signals for driving the $(i+1)^{th}$ drive line to the $(i+k)^{th}$ drive line is identical to the driving signal for driving the $(i-1)^{th}$ drive line to the $(i-j)^{th}$ drive line in sign, and the driving signal for driving the $i^{th}$ drive line is different from the driving signals for driving the $(i+1)^{th}$ drive line to the $(i+k)^{th}$ drive line and for driving the $(i-1)^{th}$ drive line to the $(i-j)^{th}$ drive line in sign.

7. The clustered scan method as claimed in claim 1, wherein when both k and j are equal to a positive integer, the driving signals for driving the $(i+1)^{th}$ drive line to the $(i+k)^{th}$ drive line is identical to the driving signal for driving the $(i-1)^{th}$ drive line to the $(i-j)^{th}$ drive line in sign, and the driving signal for driving the $i^{th}$ drive line is different from the driving signals for driving the $(i+1)^{th}$ drive line to the $(i+k)^{th}$ drive line and for driving the $(i-1)^{th}$ drive line to the $(i-j)^{th}$ drive line in sign.

8. A clustered scan method of a capacitive touch device with n drive lines and m sense lines, the method comprising steps of:
   simultaneously driving multiple drive lines selected from the n drive lines in a driving cycle, wherein the multiple drive lines include the drive lines of a $(i-j)^{th}$ drive line to a $(i+k)^{th}$ drive line, and obtaining a sum of a plurality of sensing values corresponding respectively to the plurality of stimulated drive lines through one of the sense lines; and
   incrementing i by one and resuming the step of simultaneously driving the multiple drive lines;
   wherein i is a positive integer between 1 and n, and j and k are zero or positive integers, each of the multiple drive lines is driven by a driving signal, and a sum of all the driving signals in the driving cycle is greater than zero;
   wherein when a number of the multiple drive lines simultaneously driven in the driving cycle is even, k and j are unequal;
   wherein
   when $(i-j)$ is less than 1, the first drive line is driven only or the first drive line to the $(i+k)^{th}$ drive line are simultaneously driven; and
   when $(i+k)$ is greater than n, only the $(i-j)^{th}$ drive line to the $n^{th}$ drive line are simultaneously driven such that the number of the drive lines simultaneously driven when $(i+k)$ is greater than n is less than the number of the drive lines simultaneously driven when $(i+k)$ is equal to n.

9. The clustered scan method as claimed in claim 8, wherein an absolute value of $(k-j)$ is an odd number.

10. The clustered scan method as claimed in claim 8, wherein each driving signal has a phase, and adjacent two of all the driving signals in the driving cycle have a phase shift.

11. The clustered scan method as claimed in claim 10, wherein when the phase shift between the two driving signals of each adjacent two of the drive lines is zero degrees or 180 degrees, the phase shift determines a positive sign or a negative sign of one of the adjacent two driving signals.

12. A clustered scan method of a capacitive touch device with n drive lines and m sense lines, the method comprising:
   a single-line driving mode using a first driving signal driving bordering one of the n drive lines and obtaining a first sensing value between a stimulated bordering drive line and one of the m sense lines; and
   a double-line driving mode having steps of:
      simultaneously driving the $i^{th}$ drive line and the $(i+k)^{th}$ drive line in a driving cycle and obtaining a second sensing value between the two stimulated drive lines and one of the m sense lines; and
      incrementing i by one and resuming the step of simultaneously driving the $i^{th}$ drive line and the $(i+k)^{th}$ drive line;
   wherein i is a positive integer between 1 and n, k is equal to 1, each of the $i^{th}$ drive line and the $(i+k)^{th}$ drive line is driven by a second driving signal under the double-line driving mode, and the two second driving signals in the driving cycle respectively include a positive driving signal and a negative driving signal.

13. The clustered scan method as claimed in claim 12, wherein the positive driving signal and the negative driving signal are phase shifted by 180 degrees.

14. The clustered scan method as claimed in claim 12, wherein the positive driving signal and the negative driving signal respectively have a positive-voltage waveform and a negative-voltage waveform.

15. The clustered scan method as claimed in claim 14, wherein the positive driving signal having the positive-voltage waveform is applied to the $i^{th}$ drive line and the negative driving signal having the negative-voltage waveform is applied to the $(i+k)^{th}$ drive line.

16. The clustered scan method as claimed in claim 12, further comprising a step of determining a common ground status between the capacitive touch device and an object according to the first sensing value and the second sensing values.

* * * * *